(12) United States Patent
Ahmad et al.

(10) Patent No.: US 10,529,089 B2
(45) Date of Patent: Jan. 7, 2020

(54) CROWD-SENSED POINT CLOUD MAP

(71) Applicants: GM GLOBAL TECHNOLOGY OPERATIONS LLC, Detroit, MI (US); UNIVERSITY OF SOUTHERN CALIFORNIA, Los Angeles, CA (US)

(72) Inventors: Fawad Ahmad, Los Angeles, CA (US); Hang Qiu, Los Angeles, CA (US); Fan Bai, Ann Arbor, MI (US); Ramesh Govindan, Cerritos, CA (US)

(73) Assignees: GM GLOBAL TECHNOLOGY OPERATIONS LLC, Detroit, MI (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 197 days.

(21) Appl. No.: 15/903,616

(22) Filed: Feb. 23, 2018

(65) Prior Publication Data

US 2019/0266748 A1    Aug. 29, 2019

(51) Int. Cl.
| | |
|---|---|
| *G06K 9/00* | (2006.01) |
| *G06T 7/73* | (2017.01) |
| *G06T 7/33* | (2017.01) |
| *G05D 1/02* | (2006.01) |

(52) U.S. Cl.
CPC ............ *G06T 7/74* (2017.01); *G05D 1/0246* (2013.01); *G05D 1/0274* (2013.01); *G06T 7/337* (2017.01); *G05D 2201/0213* (2013.01); *G06T 2207/10028* (2013.01); *G06T 2207/20221* (2013.01); *G06T 2207/30248* (2013.01)

(58) Field of Classification Search
None
See application file for complete search history.

(56) References Cited

U.S. PATENT DOCUMENTS

| | | | |
|---|---|---|---|
| 2016/0379366 A1* | 12/2016 | Shah | G06T 7/38 345/419 |
| 2018/0158235 A1* | 6/2018 | Wu | G06T 17/05 |
| 2018/0188043 A1* | 7/2018 | Chen | G01C 11/30 |
| 2019/0154842 A1* | 5/2019 | Adachi | G01S 19/44 |
| 2019/0271780 A1* | 9/2019 | Bravo Orellana | G01S 7/4808 |

* cited by examiner

*Primary Examiner* — Atiba O Fitzpatrick
(74) *Attorney, Agent, or Firm* — Lorenz & Kopf, LLP

(57) ABSTRACT

Systems and method are provided for controlling an autonomous vehicle. In one embodiment, a method includes: receiving sensor data from a sensor of the vehicle; determining a three dimensional point cloud map segment from the sensor data; determining a vehicle pose associated with the three-dimensional point cloud map segment; determining a pose difference based on the vehicle pose, another vehicle pose, and a two-step process, wherein the two-step process includes computing a coarse-granularity pose difference, and computing a fine-granularity pose difference; aligning the three dimensional point cloud map segment with another three dimensional point cloud map segment associated with the other vehicle pose based on the pose difference; and controlling the vehicle based on the aligned three dimensional point cloud map segments.

20 Claims, 7 Drawing Sheets

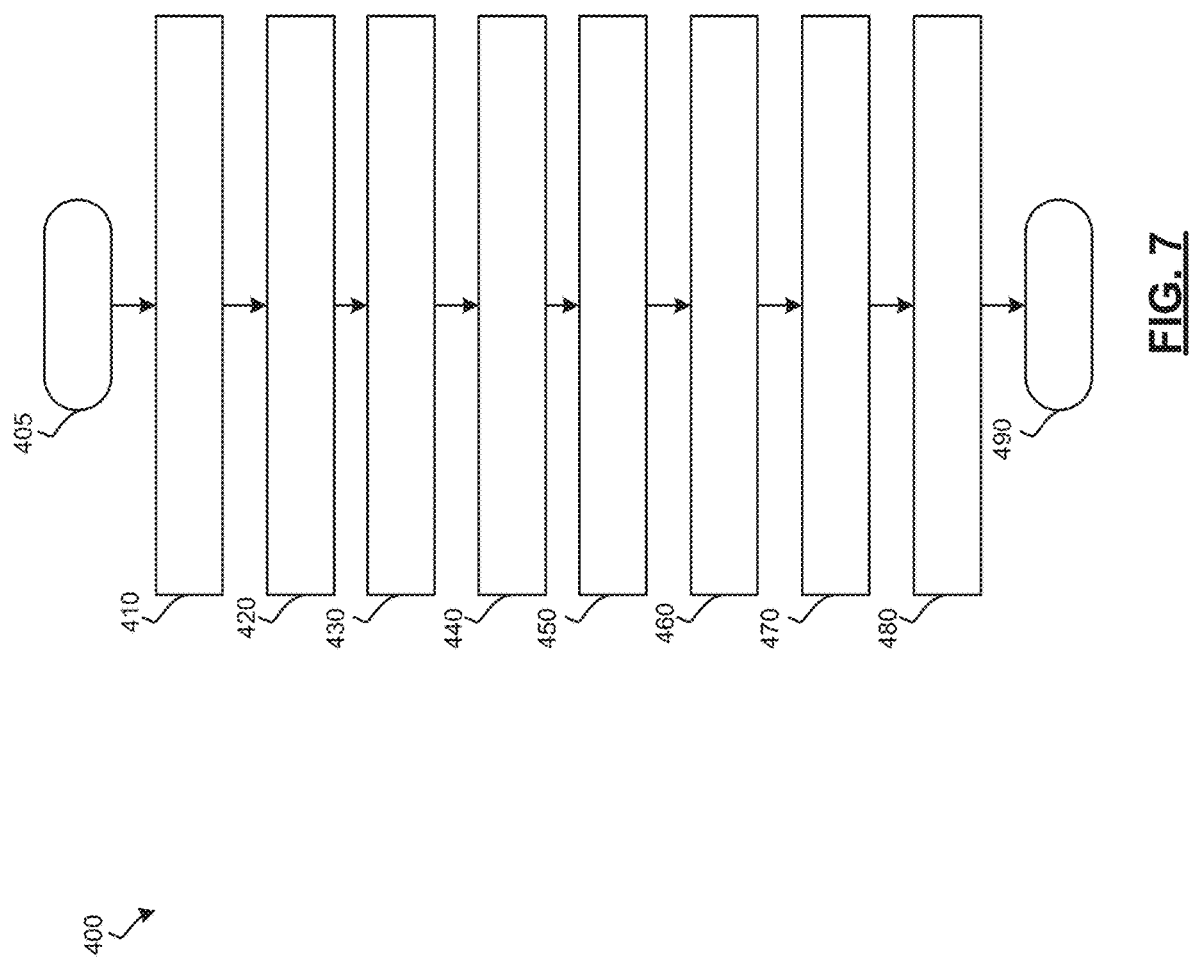

CROWD-SENSED POINT CLOUD MAP

The present disclosure generally relates to autonomous vehicles, and more particularly relates to systems and methods for constructing digital maps and controlling the vehicle based thereon.

An autonomous vehicle is a vehicle that is capable of sensing its environment and navigating with little or no user input. An autonomous vehicle senses its environment using sensing devices such as Radars, LiDARs, image sensors, and the like. The autonomous vehicle further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, in certain instances high precision digital maps are constructed of the environment and these maps are used to navigate the vehicle. Typically the digital map is constructed offline and sent to the vehicle.

These maps, commonly known as HD (high definition) maps, build on data collected from data-intensive sensors like LiDARs, Radars and stereo cameras. HD maps will need to contain the exact locations of intersections, road signs, traffic signals, lane markings, sidewalks and even dynamic objects like moving vehicles and pedestrians, etc. All autonomous vehicles will use these HD maps to localize and navigate in the real world using techniques like visual odometry. Constructing an HD map with the right amount of detail, accuracy, and precision poses a huge challenge for both the industry and academia.

Accordingly, it is desirable to provide systems and methods for constructing HD maps. It is further desirable for providing methods and systems for controlling an autonomous vehicle based thereon. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling an autonomous vehicle. In one embodiment, a method includes: receiving sensor data from a sensor of the vehicle; determining a three dimensional point cloud map segment from the sensor data; determining a vehicle pose associated with the three-dimensional point cloud map segment; determining a pose difference based on the vehicle pose, another vehicle pose, and a two-step process, wherein the two-step process includes computing a coarse-granularity pose difference, and computing a fine-granularity pose difference; aligning the three dimensional point cloud map segment with another three dimensional point cloud map segment associated with the other vehicle pose based on the pose difference; and controlling the vehicle based on the aligned three dimensional point cloud map segments.

In various embodiments, the coarse-granularity pose difference is computed based on a mean square error between two trajectories. In various embodiments, the fine-granularity pose difference is computed based on an image-plane re-projection error minimization method.

In various embodiments, the method further includes determining transformation data based on an iterative closest point convergence method using the fine-granularity pose difference, and wherein the aligning is based on the transformation data. In various embodiments, the determining the vehicle pose is based on a two dimensional feature set from the sensor data, a three dimensional point cloud associated with the two dimensional feature set, and an image-plane re-projection error minimization method. In various embodiments, the two dimensional feature set is associated with static features, and wherein the three dimensional point cloud is associated with static features.

In various embodiments, the determining the vehicle pose is based on a first two dimensional feature set from the sensor data, a second two dimensional feature set from the sensor data, a first three dimensional point cloud associated with the first two dimensional feature set, a second three dimensional point cloud associated with the second two dimensional feature set, and an image-plane re-projection error minimization method. In various embodiments, the first two dimensional feature set is associated with static features, wherein the first three dimensional point cloud is associated with static features, wherein the second two dimensional feature set is associated with dynamic features, and wherein the second three dimensional point cloud is associated with dynamic features.

In various embodiments, the method further includes merging features of the aligned three dimensional point cloud map segments based on a confidence of the feature. In various embodiments, the merging the features is further based on a multi-partite matching method.

In various embodiments, the method further includes localizing the vehicle based on the aligned three dimensional point cloud map segments and a mutli-partite matching method.

In another embodiment, a computer-implemented system for controlling an autonomous vehicle is provided. The system includes a non-transitory computer readable medium. The non-transitory computer readable medium includes: a map segment generation module configured to receive sensor data from a sensor of the vehicle, and determine a three dimensional point cloud map segment from the sensor data; a pose determination module configured to determine a vehicle pose associated with the three-dimensional map segment; a pose difference determination module configured to determine a pose difference based on the vehicle pose, another vehicle pose, and a two-step process, wherein the two-step process includes computing a coarse-granularity pose difference, and computing a fine-granularity pose difference; an alignment module configured to align the three dimensional point cloud map segment with another three dimensional map segment associated with the other vehicle pose based on the pose difference; and a control module configured to control the vehicle based on the aligned three dimensional point cloud map segments.

In various embodiments, the coarse-granularity pose difference is computed based on a mean square error between two trajectories. In various embodiments, the fine-granularity pose difference is computed based on an image-plane re-projection error minimization method.

In various embodiments, the system further includes a reference system transformation module configured to determine transformation data based on an iterative closest point convergence method using the fine-granularity pose difference, and wherein the alignment module aligns the three dimensional point cloud map based on the transformation data.

In various embodiments, the pose determination module determines the vehicle pose based on a two dimensional feature set from the sensor data, a three dimensional point cloud associated with the two dimensional feature set, and an image-plane re-projection error minimization method. In various embodiments, the two dimensional feature set is associated with static features, and wherein the three dimensional point cloud is associated with static features.

In various embodiments, the pose determination module is configured to determine the vehicle pose based on a first two dimensional feature set from the sensor data, a second two dimensional feature set from the sensor data, a first three dimensional point cloud associated with the first two dimensional feature set, a second three dimensional point cloud associated with the second two dimensional feature set, and an image-plane re-projection error minimization method.

In various embodiments, the first two dimensional feature set is associated with static features, wherein the first three dimensional point cloud is associated with static features, wherein the second two dimensional feature set is associated with dynamic features, and wherein the second three dimensional point cloud is associated with dynamic features.

In various embodiments, the alignment module is configured to merge features of the aligned three dimensional map segments based on a confidence of the feature and a multi-partite matching method.

BRIEF DESCRIPTION OF THE DRAWINGS

The exemplary embodiments will hereinafter be described in conjunction with the following drawing figures, wherein like numerals denote like elements, and wherein:

FIG. 7 is a flowchart illustrating a control method for constructing a map for use in controlling the autonomous vehicle, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
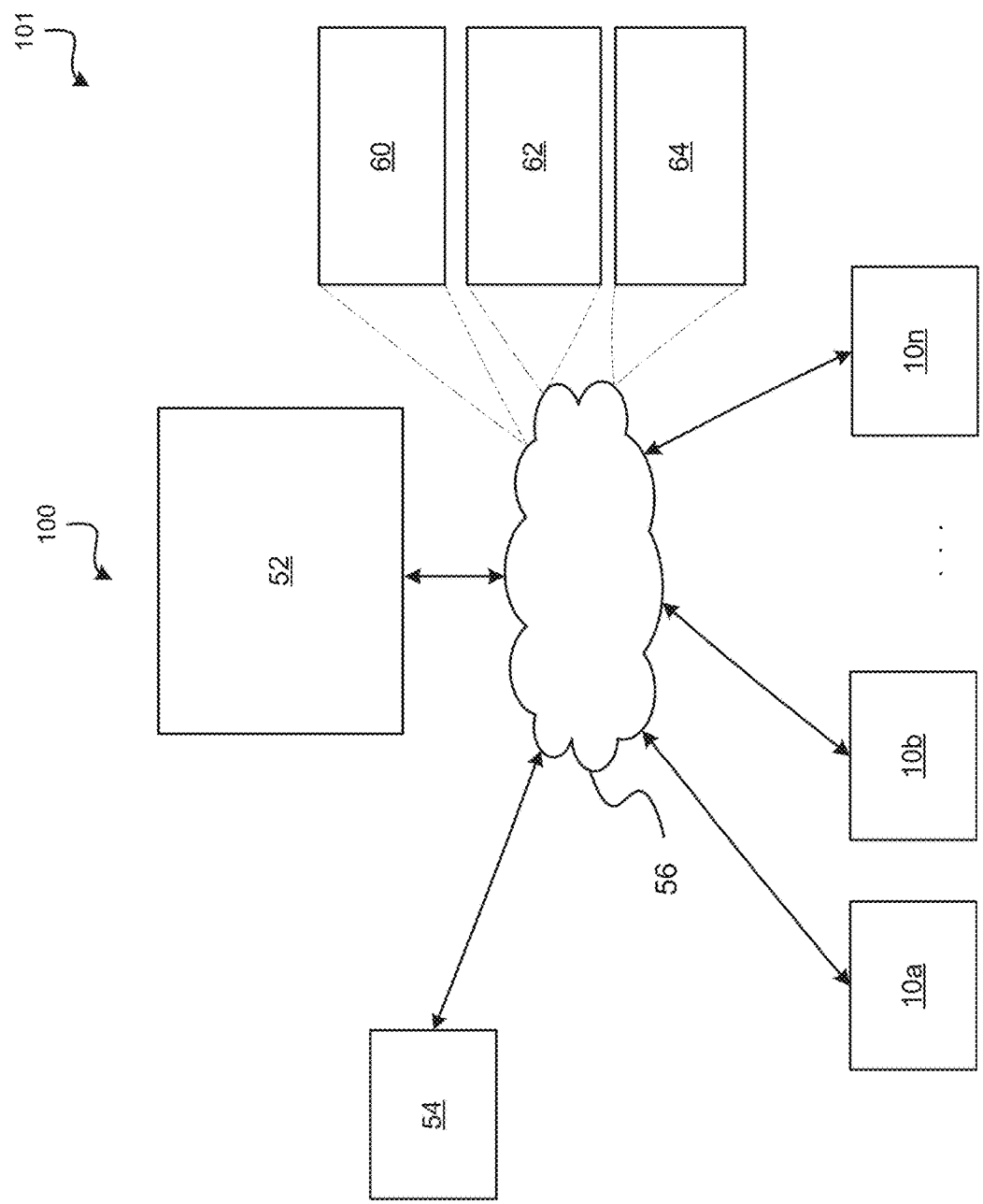
FIG. 1 is a functional block diagram illustrating a transportation system having a map construction system that is associated with one or more autonomous vehicles, in accordance with various embodiments.

With reference to FIG. 1, a map construction system shown generally at 100 is associated with a transportation system 101 that includes one or more vehicles 10a-10n in accordance with various embodiments. In general, the map construction system 100 constructs sparse HD maps from map segments received from the vehicles 10a-10n and shares the sparse HD maps with the vehicles 10a-10n for use in intelligent control of the vehicles 10a-10n. The map construction system 100 further computes a vehicle pose associated with the map segments and shares the vehicle pose with the vehicles 10a-10n for use in aligning the map segments to create the sparse HD map.

In various embodiments, the vehicles 10a-10n are autonomous vehicles. An autonomous vehicle is, for example, a vehicle that is automatically controlled to carry passengers from one location to another. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Figure 2:
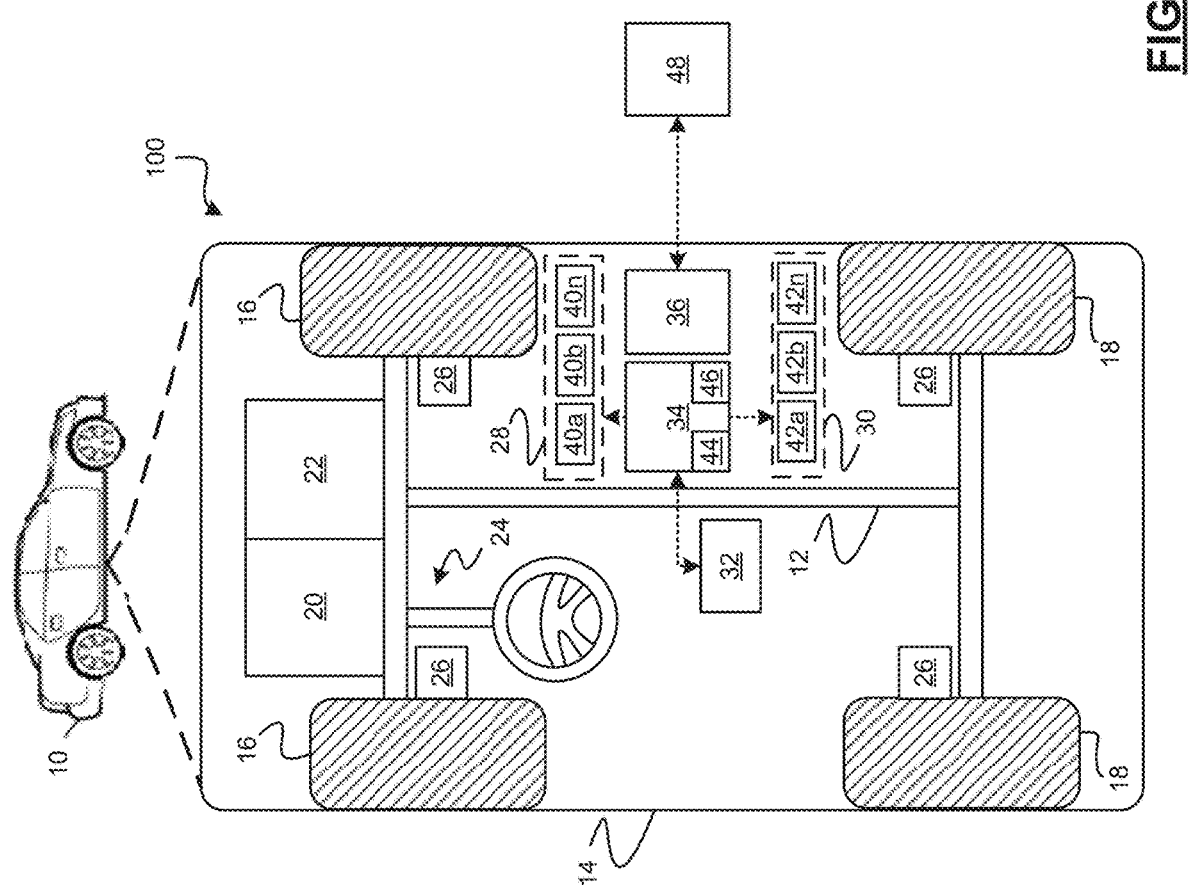
FIG. 2 is a functional block diagram illustrating an autonomous vehicle that is associated with the map construction system of FIG. 1, in accordance with various embodiments.

FIG. 2 illustrates an exemplary autonomous vehicle 10. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. As depicted in FIG. 2, the autonomous vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

As shown, the autonomous vehicle 10 further generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, Radars, LiDARs, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 1). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps include map segments that are constructed by the vehicle 10 as the vehicle is navigating the environment. In various embodiments, the defined maps include an HD map that is constructed from the map segments constructed by the vehicle 10 and/or map segments constructed by other vehicles. For example, the HD maps may be assembled by a remote system (shown in FIG. 1) and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10. The instructions, when executed by the processor 44, evaluate data of the stored high definition map when performing logic, calculations, methods and/or algorithms for automatically controlling the components of the autonomous vehicle 10. The instructions, when executed by the processor 44, generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the map construction system 100 and, when executed by the processor 44, process data received from the sensor system 28 to extract three dimensional (3D) features from the environment and aggregate the features into 3D map segments. Map segments are files that contain the extracted 3D features along with some data structures that describe the geometrical relationships between the points in the features, used for localization software. The one or more instructions, stores and communicates the perceived map segments to a remote system 52 (FIG. 1) along with metadata (timestamp, GPS, pose etc.). The one or more instructions, computes a vehicle pose associated with the map segments and stores and communicates the vehicle pose the remote system 52 (FIG. 1).

With reference back to FIG. 1, in various embodiments, the transportation system 101 includes one or more backend server systems 52, which may be cloud-based, network-based, or resident at the particular campus or geographical location serviced by the transportation system 101. The server system 52 can be manned by a live advisor, or an automated advisor, or a combination of both. The server system 52 can communicate with user devices 54 and the autonomous vehicles 10a-10n via a communication network 56.

The communication network 56 supports communication as needed between devices, systems, and components supported by the operating environment (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the server system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the server system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein.

For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

In various embodiments, the server system 52 receives 3D map segments through the communication network 56 from the vehicle 10a-10n and stitches together or aligns the different map segments into a single global HD map. The server system 52, in turn, shares the aligned map segments from the global HD map with other vehicles based on their locations to aid in localization and navigation. The global HD map is also updated in real-time to incorporate ongoing changes in the environment. Changes in the environment can include new constructions along the road, change of seasons, opening and closing of various roads, etc. If these changes are not incorporated for a specific region that a vehicle enters, the vehicle will fail to localize itself.

As can be appreciated, the subject matter disclosed herein provides certain enhanced features and functionality to what may be considered as a standard or baseline autonomous vehicle 10 and/or an autonomous vehicle based remote transportation system 101. To this end, an autonomous vehicle and autonomous vehicle based remote transportation system can be modified, enhanced, or otherwise supplemented to provide the additional features described in more detail below.

Figure 3:
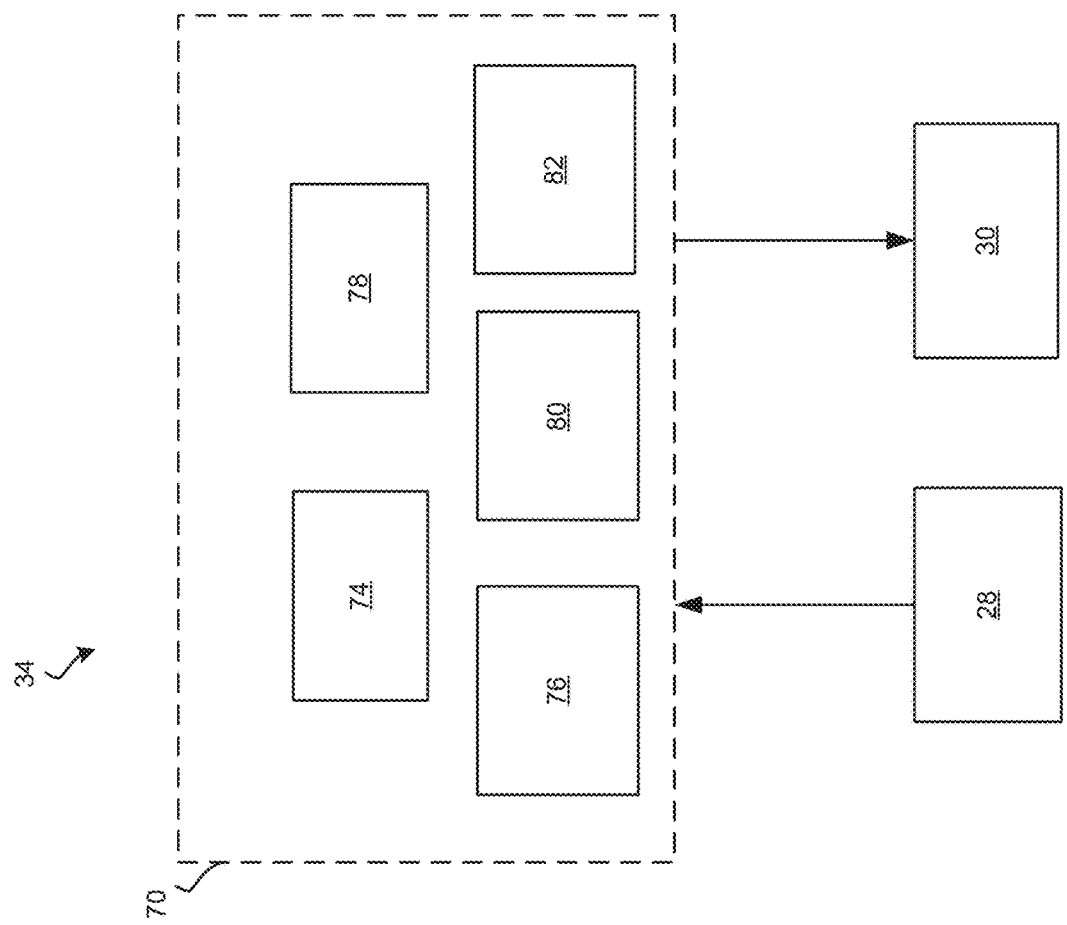
FIGS. 3 and 4 are dataflow diagrams illustrating an autonomous driving system that includes the map construction system of the autonomous vehicle, in accordance with various embodiments.
Figure 4:
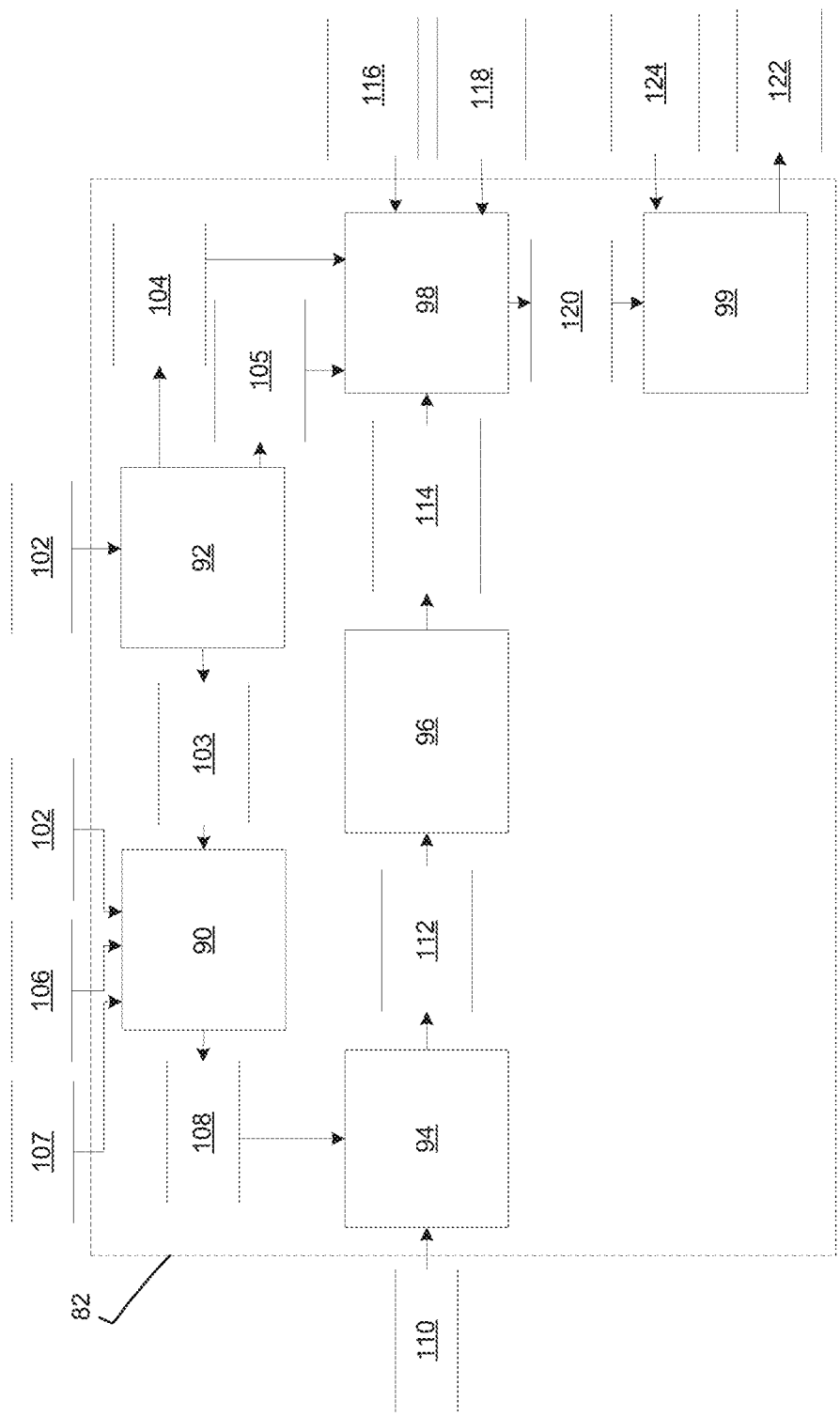
Figure 5:
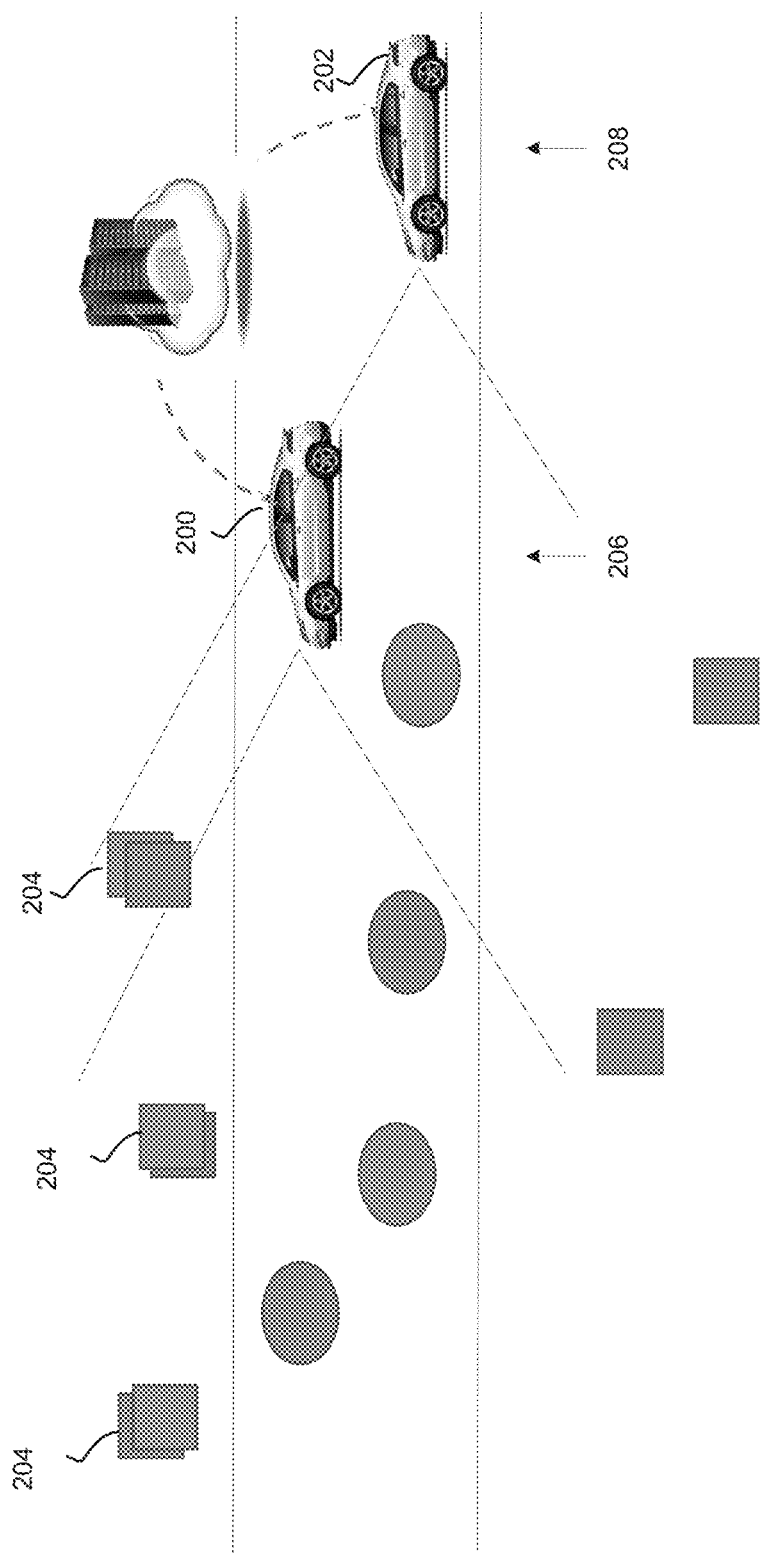
FIGS. 5 and 6 are illustrations of different feature detection scenarios.

With reference now to FIGS. 3, 4, and 5, where dataflow diagrams illustrate the map construction system 100 in more detail in accordance with various embodiments. FIG. 3 illustrates features of the map construction system 10 implemented within an autonomous driving system (ADS) 70 of the autonomous vehicle 10, for example, within the controller 34 (FIG. 1). In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, LiDARs, Radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

One or more parts of the map construction system 100 of FIG. 1 can be included within the ADS 70 for example, as part of the computer vision system 74 and/or the positioning system 76, can be included within the server system 52, or can be included partially within the ADS 70 and partially within the server system 52. The implementation can vary depending on storage capacity, processing load, cellular bandwidth, and map accuracy of the controller 34 and/or the server system 52. For exemplary purposes, the map construction system 100 is shown and descried as a single system 82.

With reference now to FIG. 4, in various embodiments the map construction system 82 includes a pose determination module 90, a map segment generation module 92, a pose difference determination module 94, a reference system transformation module 96, an alignment module 98, and a localization module 99.

The map segment generation module 92 receives as input image data 102. The image data 102 includes, for example, stereo video images obtained by the cameras of the vehicle 10. The map segment generation module 92 processes the stereo video using a video processor and genereates three dimensional (3D) point cloud data 103 including identified 3D points of features identified in the video.

The map segment generation module 92 further generates a 3D map segment 104 based on the 3D point cloud and one or more sparsification techniques. For example, the map segment generation module 92 extracts a limited number of points per frame, removing redundant 3D points; and monitors the 3D point cloud for several frames and stores only the most stable points, thus sparsifying the 3D map segment 104 even more. As the vehicle 10 (FIG. 2) progresses along a road segment, the sparse 3D point clouds are integrated into a single sparse point cloud. The points of the single sparse point cloud are positioned with reference to the starting position of the vehicle 10 (FIG. 2). The map segment generation module 92 sets the 3D map segment 104 to the integrated sparce 3D point cloud. In various embodiments, the map segment generation module 92 further computes confidence data 105 for the points in the 3D map segment 104.

The pose determination module 90 receives as input the image data 102, the 3D point cloud data 103, and global positioning system (GPS) data 106, and inertial measurement unit (IMU) data 107 that are provided, for example, by the sensor system 28 (FIG. 2) of the vehicle 10 (FIG. 2). The pose determination module 90 estimates a self-pose 108 of the vehicle 10 (FIG. 2) based on the received data 102, 106, and 107.

In various embodiments, the self-pose 108 includes six degrees of freedom (i.e., latitude, longitude, height, yaw, pitch, and roll). The pose determination module 90 estimates the self-pose 108 based on static features identified within the environment and/or dynamic features identified within the environment. For example, the pose determination module 90 determines from the image data 102 a two dimensional (2D) feature set $p\_i(t)$ of static objects and/or a two dimensional (2D) feature set $q\_i(t)$ of dynamic objects. The pose determination module 90 determines from the 3D point cloud data 103 a three dimensional (3D) point cloud $p\_i(t)$ of the static objects $p\_i(t)$ and/or of the dynamic objects $q\_i(t)$.

Based on the 2D feature set $p\_i(t)$ and/or the 2D feature set $q\_i(t)$, and the 3D point cloud $P\_i(t)$ and/or $Q\_i(t)$, the pose determination module 90 then determines the self-pose 108 using, for example the following relationship:

$$\delta(t) = \begin{bmatrix} X \\ Y \\ Z \\ \alpha \\ \beta \\ Y \end{bmatrix} = \arg \quad (1)$$

$$\min_{\delta(t)} \left( \sum_{sta} u \|p_i(t) - G(p_i(t), \delta(t))\| + \sum_{dyn} v \|q_i(t) - H(q_i(t), \delta(t))\| \right).$$

Where theta(t) represents the vehicle pose 108 of the vehicle's current driving status. The vector (x, y, z, alpha, . . . ) represents the six degrees of freedom (i.e., latitude, longitude, height, yaw, pitch, and roll).

$G(P\_i(t), theta(t))$ represents the image projection of the 3D point cloud for the static objects $P\_i(t)$ over the self-pose \theta(t). So $|p\_i(t)-G(P\_i(t), \theta(t)|$ provides for the right \theta(t) value that minimizes any re-projection error from 3D space to 2D space, which identifies all of the static objects being observed.

Similarly, $G(Q\_i(t), theta(t))$ is the image projection of 3D point cloud for dynamic objects $Q\_i(t)$ over the self-pose \theta(t). So $|q\_i(t)-H(Q\_i(t), \theta(t)|$ provides for the right \theta(t) value so that minimizes the re-projection error from 3D space to 2D space, which identifies all of the dynamic objects being observed.

In such embodiments, both static and dynamic objects are found and used together to find a right \theta (t) that minimizes the global projection error, so that \theta(t) is the best estimated self-pose of six degrees of freedom. As can be appreciated, in various other embodiments, the pose determination module 90 estimates the self-pose 108 using static objects only. In such embodiments, different and same static objects can be further identified using Bag of Visual Word (BoVW) techniques or other image classification techniques. As can further be appreciated, relationships other than that shown in equation 1 can be implemented to determine the self-pose 108 in various embodiments.

The pose difference determination module 94 receives as input the self-pose 108 of the vehicle 10 (FIG. 2) (referred to as vehicle A) and at least one other estimated self-pose 110 from another session of the vehicle 10 (FIG. 2) or another vehicle 10a-10n (FIG. 1) (referred to as vehicle B). The other self-pose 110 may be similarly computed and may be received via vehicle to vehicle communication, vehicle to remote system communication, or vehicle to everything communication.

The pose difference determination module 94 determines a pose difference 112 between the self-pose 108 $\zeta_A(t)$ and the other self-pose 110 $\zeta_B(t)$ as:

$$\delta_A(t)-\delta_B(t). \tag{2}$$

Figure 6:
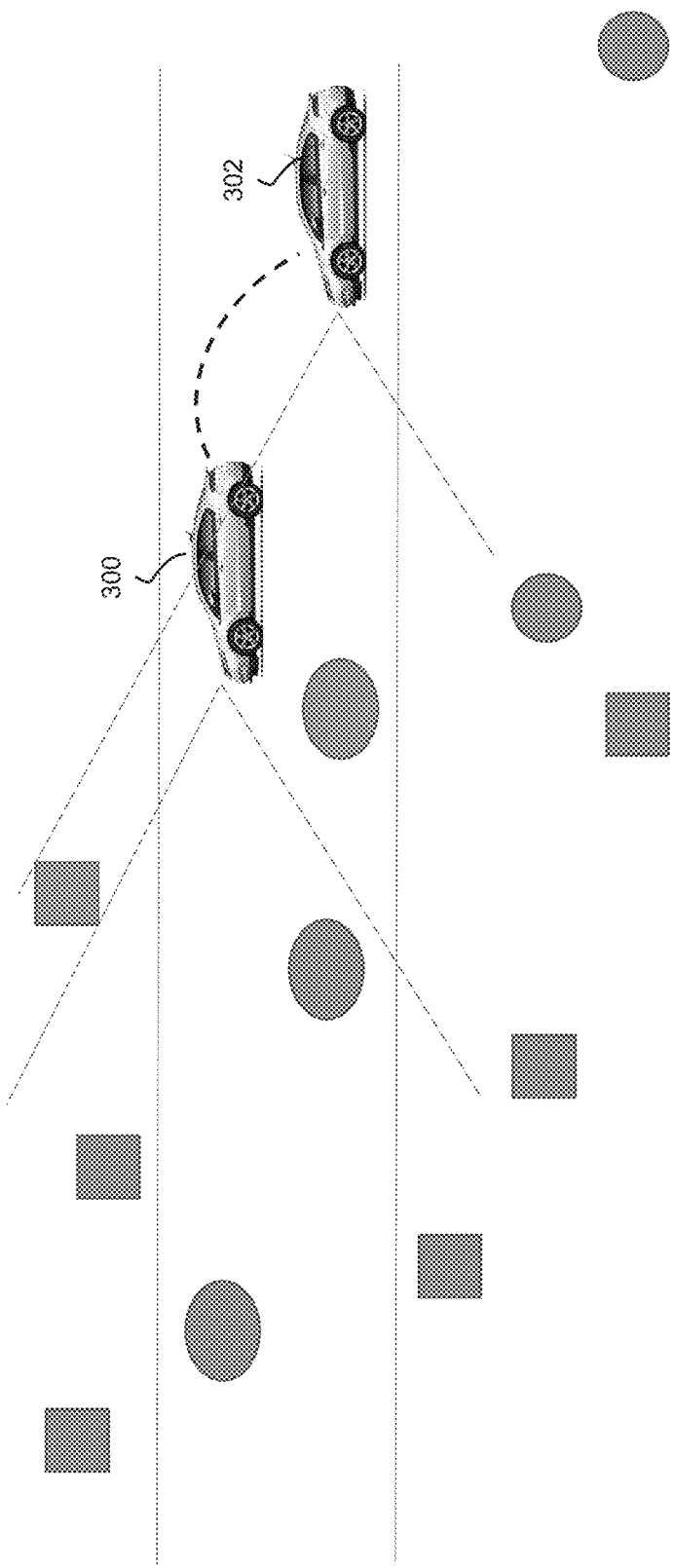

In various embodiments, depending on the when and where the other self-pose 108 came from, the pose difference 112 may be determined in real time or in non-real-time. For example, as shown in FIG. 5, when two vehicles 200, 202 have detected common static objects 204 at different time slots 206, 208 respectively, the pose difference 112 can be computed for a given location in non-real time. In another example, as shown in FIG. 6, when two vehicles 300, 302 simultaneously have detected common objects (e.g., in the same time slots) in overlapping areas, the pose difference can be computed in real-time.

With reference back to FIG. 4, in various embodiments, the pose difference determination module 94 implements a two-step process for determining the pose difference 112. For example, the first step includes a coarse-granularity pose difference determination; and the second step includes a fine-granularity pose difference refinement.

The first step, for example, computes an initial pose difference $\zeta_{AB}$ given two partially overlapping trajectories $f_A(x)$ and $g_B(x)$. Two trajectories can be defined as overlapping trajectories if they both cover/encompass a common region. For example, if A covers positions 0-10, B covers positions 8-20, A & B are defined as overlapping trajectories. The overlapping trajectories can be determined using, for example, GPS coordinates. The initial pose difference can be determined using, for example, the following relationship:

$$\delta_{AB}=\arg\min_{\delta_{AB}} MSE[f_A(x), T_{\delta_{AB}}(g_B(x))]. \tag{3}$$

Where f_A(x) and g_B(x) are the two different driving sessions but they are in fact (at least partial) overlapped. T_\theta(AB) is the transition/translation between both f(x) and g(x). In other words, the best translation/transition/difference factor T_\theta(AB) if found, so that the Mean-Square Error value between fx and gx is the smallest. Since this first step is a relatively light load computationally, it is used as a pre-filter to eliminate many potential matches. The resultant T_\theta(AB) factor is the initial hypothesis for subsequent steps which are heavy computational load. As can be appreciated, relationships other than that shown in equation 3 can be implemented to determine the initial pose difference $\zeta_{AB}$ in various embodiments.

In the second step, the image-plane re-projection error minimization method provided above and a visual place recognition as second-order refinement is used to obtain a much more refined pose difference estimate 112.

The reference system transformation module 96 receives as input the pose difference 112. The reference system transformation module 96 computes transformation data 114 including a transformation matrix between the two sessions. For example, using T_\theta(AB) as the initial determination range, the matching 3D features are selected for final alignment through an iterative closest point convergence mechanism, by determining the transformation matrix T as:

$$T=\min_T \Sigma_{k \in N} \text{dist}(P_k - T(Q_k))^{T^T}(\text{Cov}(P)+T\text{Cov}(P)T^T)$$
$$\text{dist}(P_K - T(Q_k))^T. \tag{4}$$

Where P_k and Q_K are two point cloud sets which we suspect that they are overlapping or the same. Cov(P_K) and Cov(Q_k) are the covariance of these two point cloud sets, which are used to align the underlying surface models which are more fundamental (but hidden) structures of these representative point cloud sets. T( ) is the transformation/translation matrix from P_K Point cloud space to Q_K point cloud space. TAT is the transpose of translation matrix T. Dist(P_K-T(Q_K)) is the point to point Euclidian distance of the corresponding point cloud p_k and q_k. This provides a best T( ) function so that minimizes the global MSE error. As can be appreciated, relationships other than that shown in equation 4 can be implemented to determine the transformation matrix in various embodiments.

The alignment module 98 receives as input the 3D map segment 104 of the current session, a 3D map segment 116 of the previous session, the transformation data 114, and the map segment confidence data 105, 118 associated with the 3D map segments 104, 116 respectively. The alignment module 98 aligns the current 3D map segment 104 using the previous 3D map segment 116 and the transformation data 114.

In various embodiments, the alignment module 98 further aligns or merges features of the current map segment and the previous map segment based on the confidence data 105, 118. For example, the alignment module 98 computes for each feature of the 3D map segments 104, 116 a feature-level confidence score based on the confidence values of points associated with (of or near) a defined feature. For example, the feature-level confidence C_f can be computed as:

$$C\_F=\text{avg}(C\_tl, C\_tr, C\_bl, C\_br, \dots). \tag{5}$$

Thereafter, the alignment module 98 computes for each feature a final coordinate P and a final confidence C based on the following relations:

$$P = \frac{p_0 C_{f0}\exp(0) + p_1 C_{f1}\exp(t_1 - t_0) + p_2 C_{f2}\exp(t_2 - t_0)}{\exp(0) + \exp(t_1 - t_0) + \exp(t_2 - t_0)}; \text{ and} \tag{6}$$

$$C = \frac{C_{f0}\exp(0) + C_{f1}\exp(t_1 - t_0) + C_{f2}\exp(t_2 - t_0)}{\exp(0) + \exp(t_1 - t_0) + \exp(t_2 - t_0)}. \tag{7}$$

The alignment module 98 then clusters the features using, for example, a multi-partite matching algorithm, where the similarity metric considers both the descriptor's hamming norm distance and a 3D coordinate weighted Euclidean distance:

$$sm_{ij}=\alpha\text{Norm}_{Hamming}(\text{des}_i,\text{des}_j)+\beta|p_i-p_j| \tag{8}$$

After the clustering, the alignment module 98 defines the merged feature points as:

$$P_{merge} = \sum p_i \frac{C_i}{\sum C_i}. \tag{9}$$

The alignment module 98 incorporates the merged feature points into the aligned segments 120.

The localization module 99 receives as input the aligned segments 120 and image data 124. The localization module 99 localizes the vehicle 10 (FIG. 2) with respect to the aligned map segments 120 based on the image data. For example, the localization module computes the vehicle's pose by minimizing the similarity metric of matched features between the aligned map segments 120 data and the image data 124. Specifically, features observed have a coordinate system with respect to the camera (coordinate system c). Features from the aligned segments 120 have a global coordinate system w. The localization module 99 estimates the pose of the vehicle/camera from the transformation matrix (T_cw) from coordinate system c to w. The optimization problem is formalized as the following:

$$\arg \min_{T_{cw}} \Sigma_{i,j} C_i C_j sm_{ij}. \tag{10}$$

Where i represents the observed feature from the image data. J represents the matched feature from the stitched map segments. C_i represents the confidence of the observed feature. C_j represents the confidence of the matched existing feature. And sm_ij represents the similarity metric that considers both the descriptor's hamming norm distance and 3D coordinate weighted Euclidean distance:

$$sm_{ij} = \alpha \text{Norm}_{Hamming}(des_i, des_j) + \beta |p_i - p_j|. \tag{11}$$

As can be appreciated, relationships other than that shown in equation 1 can be implemented to determine the similarity metric in various embodiments.

The localization module 99 then uses the transformation matrix (T_cw) to localize the vehicle 10 (FIG. 2) and provide localization data 122.

Referring now to FIG. 7, and with continued reference to FIGS. 1-6, a flowchart illustrates a control method 400 that can be performed by the map construction system 100 of FIG. 1 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure. In various embodiments, the method 400 can be scheduled to run based on one or more predetermined events, and/or can run continuously during operation of the autonomous vehicle 10 and/or the server system 52.

In one example, the method may begin at 405. The 3D point cloud data 103 is determined from the image data 102, for example, as discussed above at 410. The 3D map segment 104 is determined at 420 using sparsification techniques, for example, as discussed above from the image data 102. The self-pose 108 is determined at 430, for example, as discussed above. The pose difference is determined at 440 based on the two-step process, for example, as discussed above. The transformation data 114 is determined at 450, for example, as discussed above using an iterative closest point mechanism. The two 3D map segments are then aligned at 460 using the transformation data 114. Features of the aligned 3D map segments are merged at 470 based on the confidence values, for example, as discussed above. Localization of the vehicle 10 is then determined at 480 based on the aligned 3D map segments 120. Thereafter, the method may end.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an autonomous vehicle, comprising:
receiving sensor data from a sensor of the vehicle;
determining a three dimensional point cloud map segment from the sensor data;
determining a vehicle pose associated with the three-dimensional point cloud map segment;
determining a pose difference based on the vehicle pose, another vehicle pose, and a two-step process, wherein the two-step process includes computing a coarse-granularity pose difference, and computing a fine-granularity pose difference;
aligning the three dimensional point cloud map segment with another three dimensional point cloud map segment associated with the other vehicle pose based on the pose difference; and
controlling the vehicle based on the aligned three dimensional point cloud map segments.

2. The method of claim 1, wherein the coarse-granularity pose difference is computed based on a mean square error between two trajectories.

3. The method of claim 2, wherein the fine-granularity pose difference is computed based on an image-plane re-projection error minimization method.

4. The method of claim 3, further comprising determining transformation data based on an iterative closest point convergence method using the fine-granularity pose difference, and wherein the aligning is based on the transformation data.

5. The method of claim 1, wherein the determining the vehicle pose is based on a two dimensional feature set from the sensor data, a three dimensional point cloud associated with the two dimensional feature set, and an image-plane re-projection error minimization method.

6. The method of claim 5, wherein the two dimensional feature set is associated with static features, and wherein the three dimensional point cloud is associated with static features.

7. The method of claim 1, wherein the determining the vehicle pose is based on a first two dimensional feature set from the sensor data, a second two dimensional feature set from the sensor data, a first three dimensional point cloud associated with the first two dimensional feature set, a second three dimensional point cloud associated with the second two dimensional feature set, and an image-plane re-projection error minimization method.

8. The method of claim 7, where the first two dimensional feature set is associated with static features, wherein the first three dimensional point cloud is associated with static features, wherein the second two dimensional feature set is associated with dynamic features, and wherein the second three dimensional point cloud is associated with dynamic features.

9. The method of claim 1, further comprising merging features of the aligned three dimensional point cloud map segments based on a confidence of the feature.

10. The method of claim 9, wherein the merging the features is further based on a multi-partite matching method.

11. The method of claim 1, further comprising localizing the vehicle based on the aligned three dimensional point cloud map segments and a mutli-partite matching method.

12. A computer-implemented system for controlling an autonomous vehicle, comprising:
a non-transitory computer readable medium comprising:
- a map segment generation module configured to receive sensor data from a sensor of the vehicle, and determine a three dimensional point cloud map segment from the sensor data;
- a pose determination module configured to determine a vehicle pose associated with the three-dimensional map segment;
- a pose difference determination module configured to determine a pose difference based on the vehicle pose, another vehicle pose, and a two-step process, wherein the two-step process includes computing a coarse-granularity pose difference, and computing a fine-granularity pose difference;
- an alignment module configured to align the three dimensional point cloud map segment with another three dimensional map segment associated with the other vehicle pose based on the pose difference; and
- a control module configured to control the vehicle based on the aligned three dimensional point cloud map segments.

13. The system of claim 12, wherein the coarse-granularity pose difference is computed based on a mean square error between two trajectories.

14. The system of claim 13, wherein the fine-granularity pose difference is computed based on an image-plane re-projection error minimization method.

15. The system of claim 14, further comprising a reference system transformation module configured to determine transformation data based on an iterative closest point convergence method using the fine-granularity pose difference, and wherein the alignment module aligns the three dimensional point cloud map based on the transformation data.

16. The system of claim 12, wherein pose determination module determines the vehicle pose based on a two dimensional feature set from the sensor data, a three dimensional point cloud associated with the two dimensional feature set, and an image-plane re-projection error minimization method.

17. The system of claim 16, wherein the two dimensional feature set is associated with static features, and wherein the three dimensional point cloud is associated with static features.

18. The system of claim 12, wherein the pose determination module is configured to determine the vehicle pose based on a first two dimensional feature set from the sensor data, a second two dimensional feature set from the sensor data, a first three dimensional point cloud associated with the first two dimensional feature set, a second three dimensional point cloud associated with the second two dimensional feature set, and an image-plane re-projection error minimization method.

19. The system of claim 12, where the first two dimensional feature set is associated with static features, wherein the first three dimensional point cloud is associated with static features, wherein the second two dimensional feature set is associated with dynamic features, and wherein the second three dimensional point cloud is associated with dynamic features.

20. The system of claim 12, wherein the alignment module is configured to merge features of the aligned three dimensional map segments based on a confidence of the feature and a multi-partite matching method.

* * * * *